Jan. 20, 1942.  H. HOWE  2,270,682
HORN SIGNALING DEVICE FOR MOTOR VEHICLES
Filed March 23, 1940
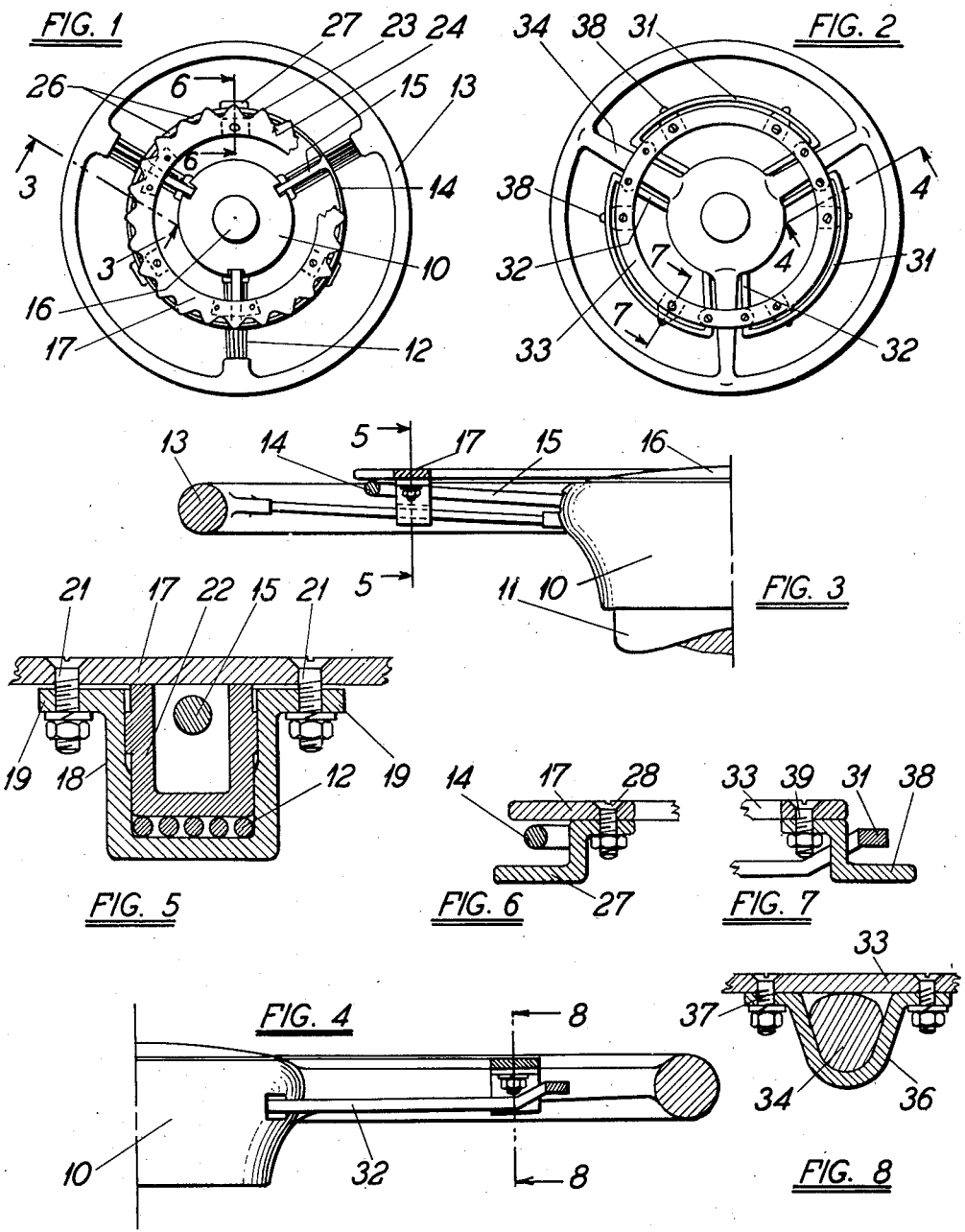
HAROLD HOWE
INVENTOR.
BY *Philip S. Hopkins*
ATTORNEY.

Patented Jan. 20, 1942

2,270,682

UNITED STATES PATENT OFFICE 2,270,682

HORN SIGNALING DEVICE FOR MOTOR VEHICLES

Harold Howe, New York, N. Y.

Application March 23, 1940, Serial No. 325,583

12 Claims. (Cl. 74—484)

This invention relates generally to horn signaling devices for motor vehicles and more particularly to extensions of the horn actuating switch, known as horn rings and usually associated with the steering wheel or steering column of such vehicles.

The horn operating switches of present day motor vehicles are usually carried at the top of the steering column and in many instances are provided with extensions in the form of a ring or segments connected to the horn switch and extending radially to a point adjacent the vehicle steering wheel to be easily reached by a finger of the operator while still retaining his hand upon the steering wheel.

Some of the present horn rings are arranged to close the horn switch by depressing the ring and others are intended to operate by an upward pull or tilt. Still others are connected and arranged to be pulled or pushed by the operator in a direction transverse to the axis of the steering column.

It has been found, however, that such horn rings, segments or extensions are easily bent and damaged by the use of excessive pressure thereon by the operator when sounding the horn or by the operator striking the extensions with his elbow or hand in steering or in moving about in entering or leaving the vehicle. Moreover, in a great many instances, the horn is unintentionally sounded due to a slip or mismovement of the operator's hands or arms.

The present invention has for its primary object, the provision of a protecting guard or protecting stops for the horn rings, segments, or other extensions of the horn switches of motor vehicles.

Other objects and advantages of the invention will become apparent from a reading of the following description taken in connection with the accompanying drawing, in which:

Fig. 1 is a top plan view of a motor vehicle steering wheel embodying one form of the present invention.

Fig. 2 is a view similar to that of Fig. 1 but showing a modified embodiment of the invention.

Fig. 3 is a fragmentary sectional view taken substantially on the line 3—3 of Fig. 1.

Fig. 4 is a view similar to that of Fig. 3 but taken substantially on the line 4—4 of Fig. 2.

Fig. 5 is a fragmentary sectional view taken on the line 5—5 of Fig. 3.

Fig. 6 is a fragmentary sectional view taken substantially along the line 6—6 of Fig. 1.

Fig. 7 is a view similar to that of Fig. 6 but taken along the line 7—7 of Fig. 2, and;

Fig. 8 is a sectional view taken on the line 8—8 of Fig. 4.

The term "horn ring" as hereinafter employed throughout the description and claims, is intended to broadly define a circular horn ring, one of segmental shape, one comprising a plurality of independently operable segments or any other arcuate extension connected to actuate a vehicle horn.

Referring now to the drawing, reference numeral 10 indicates a cap forming the hub of a steering wheel 13 rotatably mounted upon the steering column 11 and connected in the usual manner to steer the front wheels of a motor vehicle. Suitable horn actuating switch mechanism (not shown) may be positioned within the cap 10 beneath a horn button 16 and electrically connected to cause the sounding of the vehicle horn when the horn button 16 is depressed. Yieldable wheel spokes 12 may be connected at their inner ends to the hub 10 and may extend radially outwardly to be connected in any suitable manner to the rim of the steering wheel 13.

In Fig. 1 the horn ring 14 is in the form of a complete circle positioned concentrically with relation to the steering column and steering wheel and of such diameter as to extend radially from the steering column sufficiently for an operator to depress the ring 14 by a finger movement without removing his hand from the steering wheel. The horn ring 14 is connected to the horn switch by suitable radially extending supports 15, which, in this instance, overlie the spokes 12 of the steering wheel and extend into the cap or hub 10 to connect with the switch in a well known manner, so that depression of the ring 14 will cause actuation of the switch and the sounding of the horn.

In accordance with the invention, a guard 17 movable with the steering wheel 13 is provided for the horn ring 14 to prevent damage thereto. The guard 17 is also circular in shape and of substantially the same diameter as the horn ring 14 and as shown in Figs. 3, 5 and 6, may be secured to the wheel spokes 12 in vertical spaced relation thereto by any suitable means such as a U clamp 18 extending from the underside of the spokes 12 upwardly to a position slightly above the normal position of the horn ring 14, where the clamp may be provided with flanges 19 to which the guard ring 17 may be secured as at 21. A suitable U shaped spacer member 22 may be positioned between the upper side of the wheel spokes 12 and the underside of the guard ring 17 to position the guard ring in fixed relation to the wheel spokes and the horn ring 14.

To provide the necessary protection and still permit the operator to actuate the horn ring 14 with his thumb or finger, the periphery of the guard 17 is formed to provide radial projecting portions 23 which overlie the horn ring 14 and notches 24 extending inwardly from the projections 23 to provide small exposed portions 26 of the horn ring 14 which are, however, sufficiently large to adequately receive the thumb or finger of the operator.

It will thus be seen that the horn ring 14 may be depressed to actuate the horn switch in the usual manner by extending a finger into any one of the notches 24 of the guard 17, but that the horn ring is protected from a damaging blow by the hand or arm of the operator.

To further protect the horn ring 14 from damage by extreme downward pressure, the guard 17 may be provided at spaced points about its periphery with supplemental guards 27 as shown in Fig. 6, which may be secured to the underside of the guard as at 28 and angularly shaped to extend downwardly and radially to form stops for the horn ring 14 preventing further depression thereof. Thus, movement of the horn ring 14 may take place between the upper guard 17 and the supplemental guards 27, as shown in Fig. 6.

With reference to Figs. 2, 4, 7 and 8 wherein a modification of the invention is disclosed, the horn ring is shown as a plurality of individually operable segments 31, three in the form shown, each segment extending substantially the distance between the wheel spokes and each connected to the horn switch at the free ends thereof by inwardly extending arms 32. In this instance, the guard ring 33 may be of slightly less diameter than the entire horn ring 31 and may overlie the connecting arms 32 which extend into the wheel hub 10. The guard 33 may be secured to each of the wheel spokes 34 by a U clamp 36 as at 37, and as clearly shown in Fig. 8. If desired, this guard ring 33 may also be provided with downwardly and radially extending projections or stops 38, secured as at 39, to the peripheral edge thereof to limit the downward movement of the segments 38, upward movement of the segments being limited by the guard ring 33 which overlies the connecting arms 32. With this construction, a guard ring is provided above the horn ring 31 and thus forms a protection therefor against severe shocks. It will be understood that one or more of such segments may be provided, as desired, within the scope of this invention. However, in this embodiment, the entire peripheral surface of the horn ring 31 is exposed so that it may be easily touched by the operator's finger. Moreover, damaging downward pressure on the horn ring is prevented by the stops 38. This construction also lends itself to the type of horn ring which is connected to actuate a horn switch in response to a manual pull or push in a direction transverse to the steering column.

It will thus be seen that the present invention provides a practical and economical guard for the horn rings of motor vehicles and one which will prevent damage to the horn ring or unintentional sounding of the horn.

Various modifications in construction and design will immediately suggest themselves to those skilled in the art and it should be understood that such modifications may be made without departing from the spirit or scope of the invention as set forth in the appended claims.

I claim:

1. In a motor vehicle, a steering wheel, an arcuate horn ring associated with said steering wheel and connected to effect sounding of the vehicle horn, and a substantially coextensive guard for said horn ring positioned above and in spaced relation thereto and connected to said steering wheel for movement therewith.

2. In a motor vehicle having a steering wheel and horn actuating means associated therewith, a movable, arcuate shaped extension of said horn actuating means, of similar shape and circumferential extent and a guard positioned above said extension to prevent unrestricted movement thereof, said guard being movable with said steering wheel.

3. In a motor vehicle, a steering wheel having a hub, a horn actuating member extending radially from said hub to a point adjacent the rim of said steering wheel, said actuating member having an arcuate outer extremity within reach of a finger of the vehicle operator while his hand is resting upon the rim, and a circumferentially coextensive guard for the outer extremity of said horn actuating member positioned above and in fixed spaced relation thereto to prevent undue pressure being exerted thereon, said guard being movable with said steering wheel.

4. In a motor vehicle, a steering wheel, a horn actuating member associated with said steering wheel and having an arcuate portion within said steering wheel in close proximity thereto and arranged for operation while the hand of the driver engages the rim of said steering wheel, and a guard positioned inwardly of and above said actuating member and being substantially coextensive therewith, said guard being movable with said steering wheel.

5. In a motor vehicle, a steering wheel, an arcuate horn actuating member associated with said steering wheel, and guards positioned above and below said actuating member, the guard above being of the same shape and circumferential extent as said arcuate horn actuating member, and the guard below underlying said arcuate horn actuating member to serve as a stop against downward movement of the same, and both guards being movable with said steering wheel.

6. In a motor vehicle, a steering wheel, an arcuate horn actuating member concentrically associated with said steering wheel, and a guard extending above and in spaced relation to said actuating member and being substantially coextensive with said actuating member and carried by said steering wheel, said guard being movable with said steering wheel.

7. In a motor vehicle, a steering wheel, an arcuate horn actuating member associated with said steeering wheel, and guards positioned above and below said actuating member and carried by said steering wheel, the guard below being arranged to underlie said actuating member to serve as a downward stop and said guards being movable with said steering wheel.

8. In a motor vehicle having a steering column and a steering wheel comprising a hub rotatably mounted upon said steering column and encasing the vehicle horn switch mechanism, a radial extension from said wheel hub formed with an arcuate portion at its outer end and connected to actuate said switch mechanism upon manual movement in a direction substantially parallel to the axis of the steering column, and guard means directly engageable by the arcuate portion of said radial extension to limit such movements thereof, said guard means being movable with said steering wheel and including an arcuate portion above the outer end of said radial extension and coextensive therewith.

9. In a motor vehicle having a horn actuating switch, a vehicle steering wheel, a horn ring for actuating said horn switch and positioned in concentric relation to said steering wheel, and a guard ring for said horn ring also positioned in concentric relationship to said steering wheel, said guard ring extending in spaced relation above said horn ring and being of substantially the same diameter thereas.

10. In a motor vehicle having a steering wheel provided with a hub encasing the vehicle horn switch mechanism, a circular horn ring of lesser diameter than that of said steering wheel positioned in concentric relationship thereto and connected through said steering wheel hub to said horn switch mechanism, and a guard ring carried by said steering wheel positioned above said horn ring, said guard ring being of substantially the same diameter as said horn ring and being provided on its periphery with a plurality of cutout portions forming notches to receive a finger of the vehicle operator to actuate said horn ring.

11. In a motor vehicle having a steering wheel provided with radial spokes and a hub encasing the vehicle horn switch mechanism, a manually operable horn actuating member of arcuate shape positioned between two spokes of said steering wheel and connected at its free ends to said horn switch mechanism through said hub by radially extending arms, a guard member also of arcuate shape and of lesser radius than that of said arcuate horn actuating member secured to a spoke of said steering wheel in overlying relationship to one of said radial arms, and an auxiliary guard secured to said arcuate guard and extending in spaced relation thereto downwardly and radially.

12. In a motor vehicle having a steering wheel provided with radial spokes and a hub encasing the vehicle horn switch mechanism, a manually operable horn actuating member of arcuate shape positioned between two spokes of said steering wheel and connected at its free ends to said horn switch mechanism through said hub by radially extending arms, and a guard member also of arcuate shape and circumferentially coextensive with said arcuate horn actuating member positioned above and in spaced relation thereto, said guard member being secured to a spoke of said steering wheel.

HAROLD HOWE.